United States Patent
Burwell et al.

(10) Patent No.: US 7,229,233 B2
(45) Date of Patent: Jun. 12, 2007

(54) DOUBLE WALLED CONTAINMENT SUMPS

(75) Inventors: John Burwell, Eagan, MN (US);
Michael G. Zais, Lakeville, MN (US);
Roberto Sanchez, Corona, CA (US)

(73) Assignee: Xerxes Corporation, Minneapolis, MN (US)

( * ) Notice: Subject to any disclaimer, the term of this patent is extended or adjusted under 35 U.S.C. 154(b) by 0 days.

(21) Appl. No.: 10/796,198

(22) Filed: Mar. 10, 2004

(65) Prior Publication Data

US 2005/0201830 A1    Sep. 15, 2005

(51) Int. Cl.
*G01M 3/02*    (2006.01)
(52) U.S. Cl. .............. 405/52; 137/236.1; 137/558; 137/559; 220/560.03; 73/49.2; 141/94
(58) Field of Classification Search ............ 405/52–55; 137/236.1, 551, 558, 559; 220/560.03; 73/49.2, 73/49.3, 40; 141/94, 95
See application file for complete search history.

(56) References Cited

U.S. PATENT DOCUMENTS

| | | | |
|---|---|---|---|
| 4,639,164 A | | 1/1987 | Pugnale et al. |
| 5,222,832 A | * | 6/1993 | Sunderhaus et al. .......... 405/52 |
| 5,295,760 A | * | 3/1994 | Rowe ........................... 405/52 |
| 5,544,974 A | * | 8/1996 | Berg et al. ..................... 405/53 |
| 5,567,083 A | * | 10/1996 | Osborne .................. 405/154.1 |
| 5,590,981 A | * | 1/1997 | Osborne .................. 405/154.1 |
| 5,595,456 A | | 1/1997 | Berg et al. |
| 5,775,842 A | * | 7/1998 | Osborne .................. 405/154.1 |
| 5,988,945 A | * | 11/1999 | Bouvier ........................ 405/54 |
| 6,116,817 A | * | 9/2000 | Osborne .................. 405/154.1 |
| 6,266,928 B1 | * | 7/2001 | Argandona .................... 52/20 |
| 6,280,614 B1 | | 8/2001 | Berg et al. |
| 6,398,057 B1 | * | 6/2002 | Berg et al. ............... 220/62.19 |
| 6,551,024 B1 | * | 4/2003 | Berg et al. ..................... 405/54 |
| 6,698,610 B2 | * | 3/2004 | Berg et al. ............... 220/62.19 |
| 6,729,797 B2 | * | 5/2004 | Manger et al. ............... 405/52 |
| 6,834,534 B2 | * | 12/2004 | Halla et al. .................. 73/49.2 |
| 6,886,390 B2 | * | 5/2005 | Schneider .................... 73/49.2 |
| 7,043,965 B2 | * | 5/2006 | Schneider .................... 73/49.2 |

(Continued)

OTHER PUBLICATIONS

Drawing of "Height Adjustable Compliant Round Chamber Systems", Product Description: 48" shallow burial adaptor ring, extension with a height adjustable offset corbel and round 36" raised cover; Drawing No. US25007; Product Code SCR14-336/OFF/SH; 2003.

(Continued)

*Primary Examiner*—Tara L Mayo
(74) *Attorney, Agent, or Firm*—Jagtiani + Guttag

(57) ABSTRACT

A double walled riser sump has an annular space between the two walls. The provision of the annular space provides for monitoring the integrity of the two walls of the sump. The two walls of the sump are preferably separated by a thin film or a distance fabric that allows the passage of fluids, and preferably liquids. The annular space may be in fluid communication with a reservoir holding a monitoring fluid and positioned near the top of the sump to be easily accessible. In some embodiments, a top of the riser sump is also double walled and the top annular space is in fluid communication with the annular space between the vertical walls. If a leak develops in either wall of the sump, a corresponding drop in the fluid level of the reservoir will occur.

28 Claims, 10 Drawing Sheets

U.S. PATENT DOCUMENTS

2003/0228201 A1    12/2003    Dorris

OTHER PUBLICATIONS

Drawing of "Height Adjustable Compliant Round Changer Systems", Product Description: 48" shallow burial adaptor ring, extension with a height adjustable offset corbel and round 36" raised cover; Drawing No. US25131; Product Code SCR14-336/OFF/SH; 2003.

Drawing of "Height Adjustable Compliant Round Chamber Systems", Product Description: 48" shallow burial adaptor ring, extension with a height adjustable offset corbel and round 36" raised cover; Drawing No. US25132; Product Code SCR14-336/OFF/SH, 2003.

Drawing of "Height Adjustable Compliant Round Chamber Systems", Product Description: 48" shallow burial adaptor ring, extension with a height adjustable offset corbel and round 36" raised cover; Drawing No. US25133; Product Code SCR14-336/OFF/SH, 2003.

Drawing of "Height Adjustable Compliant Round Chamber Systems", Product Description: 48" diameter base chamber with an offset height adjustable corbel and round 36" raised cover; Indirect Fill; Drawing No. US25004; Product Code SCR14-336/OFF, 2003.

Drawing of "Height Adjustable Compliant Round Chamber Systems", Product Description: 48" diameter base chamber with a height adjustable corbel and round 36" raised cover; Drawing No. US25128; Product Code SCR14-3366/OFF, 2003.

Drawing of "Height Adjustable Compliant Round Chamber Systems", Product Description: 48" diameter base chamber with a height adjustable offset corbel and round 36" raised cover; Drawing No. US25129; Product Code SCR14-226/OFF, 2003.

Drawing of "Height Adjustable Compliant Round Chamber Systems", Product Description: 48" diameter base chamber with a height adjustable offset corbel and round 36" flat sealed cover; Drawing No. US25130; Product Code SCR14-336/OFF, 2003.

Drawing of "Height Adjustable Compliant Round Chamber Systems", Product Description: 48" diameter base chamber with an offset height adjustable corbel and round 36" raised cover; Indirect Fill; Drawing No. US25004; Product Code SCR14-336/off, 2003.

Drawing of "Height Adjustable Compliant Round Chamber Systems", Product Description: 48" diameter base chamber with a height adjustable offset corbel and round 36" raised cover; Drawing No. US25134; Product Code SCR14-336/OFF/DP, 2003.

Drawing of "Height Adjustable Compliant Round Chamber Systems", Product Description: 48" diameter base chamber with a height adjustable offset corbel and round 36" raised cover; Drawing No. US25135; Product Code SCR14-336/OFF/DP, 2003.

Drawing of "Height Adjustable Compliant Round Chamber Systems", Product Description: 48" diameter base chamber with a height adjustable offset corbel and round 36" flat sealed cover; Drawing No. US25136; Product Code SCR14-336/OFF/DP, 2003.

Photograph of Sump Pump.

* cited by examiner

DOUBLE WALLED CONTAINMENT SUMPS

BACKGROUND OF THE INVENTION

1. Field of the Invention

The invention relates to a double walled riser containment sump and reservoir suitable for use with underground storage tanks.

2. Discussion of the Background

Underground storage tanks are used in a wide variety of locations to store materials underground. The stored materials are often harmful to the environment. Examples of such materials include gasoline and other petroleum products, e.g., oil and waste oil, as well as toxic raw materials and waste from manufacturing processes. Because of the harmful nature of these materials, it is especially important to ensure that underground storage tanks containing such materials do not leak or release these materials into the environment.

Concern over this possibility has lead many governmental authorities to require secondary containment for tanks that store such materials. One of the most common methods for providing secondary containment is through the use of double walled underground storage tanks. The assignee of the present application, Xerxes Corporation, has manufactured and sold double walled underground storage tanks prepared from corrosion resistant materials such as fiber reinforced plastic (FRP) since 1984. These tanks have proven very reliable.

However, no matter how reliable the underground storage tank itself is, there is always the possibility that the pipes connected to the tank may fail. In recognition of this possibility, the use of double-walled piping has come into practice. Double walled piping includes an inner wall separated from an outer, or second, wall. The inner wall provides a passage for fluid between the inside of the underground storage tank and a desired destination. The outer wall of the double walled piping prevents any fluid escaping from a breach in the inner wall from leaking into the ground, thereby providing the secondary containment function.

Double walled piping installations typically include a riser containment sump in fluid communication with the annulus formed by the two walls of the piping so fluid leaking from the inner wall of the pipe will be carried by the outer wall to and contained by the riser sump. The most common type of this containment sump is formed by a riser extending from the storage tank. An example of a double-walled piping/underground storage tank installation with such a single wall sump is illustrated in U.S. Pat. No. 4,639,164 to Pugnale et al. A sensor is typically placed at the bottom of the sump so that any leaks are detected. In order for the sump to function properly, the sump must be watertight. An exemplary water-tight riser is described in U.S. Pat. No. 5,595,456, also assigned to Xerxes Corp.

It has been recognized that the ability of the system to contain leaks will be compromised if the sump leaks. To rectify this problem, the California legislature has required that sumps be either tested periodically or continuously monitored.

SUMMARY OF THE INVENTION

The aforementioned issues are addressed to a great extent by the present invention, which provides a double walled riser sump with an annular space between the two walls. (As used herein, "annular space" refers to the three dimensional interstice between two closely spaced walls and includes spaces that have ring shaped cross sections as well as spaces with cross sections of other shapes.) The provision of the annular space between the two walls provides a means for monitoring the integrity of the two walls of the sump. In preferred embodiments, the two walls of the sump are separated by a thin film or a distance fabric that allows the passage of fluids, and preferably liquids. Alternatively, the annular space may be largely free of materials other than structural elements and, in the case of a wet annulus monitoring system, monitoring fluid. In some embodiments, the annular space is in fluid communication with a reservoir holding a monitoring fluid such as brine. Preferably, the reservoir is positioned such that it is easily accessible. In this manner, if a leak develops in either wall of the sump, a corresponding drop in the fluid level of the reservoir will occur. In some embodiments, the sump has a round cross-sectional shape. In other embodiments, the sump has a cross sectional shape in the form of a multiple-sided polygon. The provision of flat surfaces on the riser wall facilitates the connection of piping to the riser wall.

BRIEF DESCRIPTION OF THE DRAWINGS

The aforementioned advantages and features of the present invention will be more readily understood with reference to the following detailed description and the accompanying drawings in which.

DETAILED DESCRIPTION

In the following detailed description, a plurality of specific details, such as riser dimensions and types of annular material, are provided in order to provide a through understanding of the present invention. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

Figure 1:
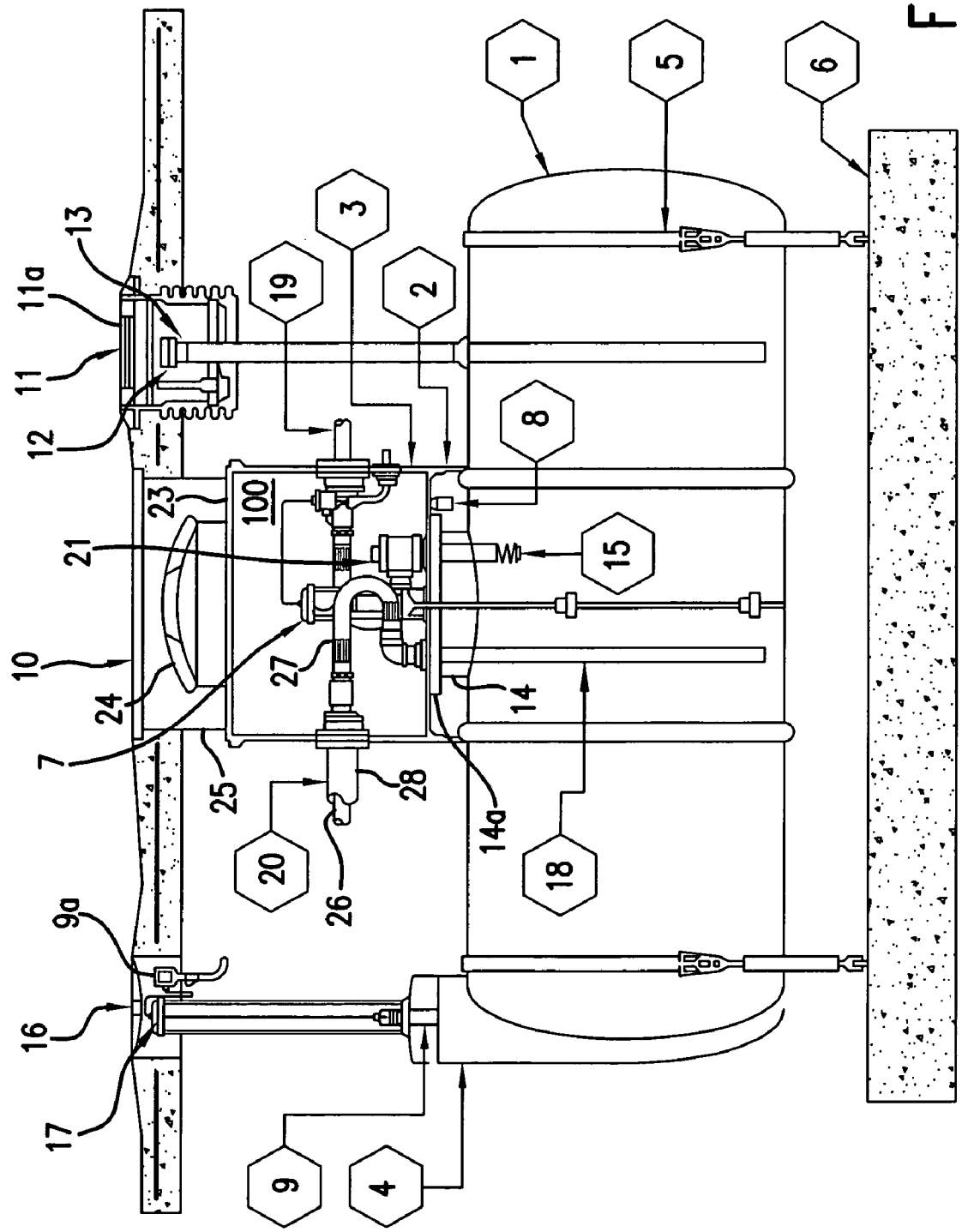
FIG. 1 is a perspective view of a conventional gasoline underground storage tank installation.

FIG. 1 illustrates a typical underground storage tank installation, in this case, a gasoline tank installation. A double walled underground storage tank ("UST") 1 is secured by a pair of retaining straps 5 attached to a pair of deadmen 6 (one of which is visible in FIG. 1). The deadmen 6 may be of a conventional type or may be of the type described in U.S. patent application Ser. No. 10/163,368, entitled "Low Profile Deadman And Method For Shipping The Same With a Tank", filed on Jun. 7, 2002, and owned by Xerxes Corp. As is well known in the art, the straps 5 and deadmen 6 are sometimes necessary to prevent flotation of the UST 1 in the presence of a high water table. Other types of retaining systems, including above and below ground slabs, may also be used.

The double-walled UST 1 includes a hydrostatic monitoring system 4. The hydrostatic monitoring system monitors the level of a monitoring fluid, typically brine, between the two walls of the double walled UST 1. The hydrostatic monitoring system 4 includes a monitoring sensor 9 connected to a communication module 9a through tube 17. The tube 17 is accessible via manhole 16. The hydrostatic monitoring system 4 is used with a double walled UST 1 with a wet annulus. However, the invention is not limited to USTs with wet annulus monitoring systems and may also be used with a UST having a dry annulus or an annulus that is slightly pressurized either negatively or positively. In fact, in preferred embodiments of the invention, the annulus of the UST is not in fluid communication with the annular space between the two walls of the sump of the present invention. It is therefore possible to use two different types of monitoring systems in the UST 1 and sump of the present invention (e.g., a UST with a dry annulus and a sump with a brine-filled annular space).

The interior of the UST 1 may be filled from ground level by removing the cover 11a from the spill containment sump 11, which provides access to the fill cap 12 covering the fill tube 13.

The UST 1 includes a collar 2 to which is attached a riser 3. The collar 2 and riser 3 surround a manway 14 covered by a manway cover 14a. A riser cover 23 sits atop the riser 3. The riser cover 23 includes a removable domed cover 24. The collar 2, riser 3, riser cover 23 and domed cover 24 together form a watertight compartment that together form a sump 100. An access way 25 and ground level access way cover 10 provide access to the domed riser cover 24. The access way 25 and access way cover 10 are not part of the sump and are not necessarily water tight.

A level probe 7 is disposed within the sump 100 and passes through the manway cover 14a to monitor the level of fluid within the UST 1. A single walled vent pipe 19 is connected to the housing for the level probe 7 and passes through the wall of the riser 3 to provide venting for the UST 1. Also disposed within the sump 100 is an extractor assembly 21, which is connected through the manway cover 14a to ball float 15 in the interior of UST 1.

A double walled pipe 20 carries gasoline to the UST 1. The double walled pipe 20 passes through a side of riser 3. The interior wall 26 of double walled pipe 20 is connected, via flex connector 27, to a pipe 18 passing through the manway cover 14a to the interior of the UST 1. The space between the outer wall 28 and inner wall 26 of double wall pipe 20 is in fluid communication with the sump 100. As discussed above, any fluid leaking from interior wall 26 of double wall pipe 20 will be contained by outer wall 28 and transported to sump 100 for containment. A sensor 8 detects any fluid in sump 100 and triggers an alarm system (not shown in FIG. 1).

As discussed above, a leak in the sump 100 has the potential to compromise the containment of fluid leaking from the interior wall 26 of double wall pipe 20. For example, if a leak develops around the collar 2 below the sensor 8, fluid leaking from interior wall 26 may pass through such a leak in the collar 2 and not be detected. Additionally, if a leak develops in the collar 2 above the sensor 8 or in the riser 3, fluid leaking from the interior wall 26 of double wall pipe 20 will trigger the alarm 8 and may escape from such leak before preventive action can be taken.

Figure 2:
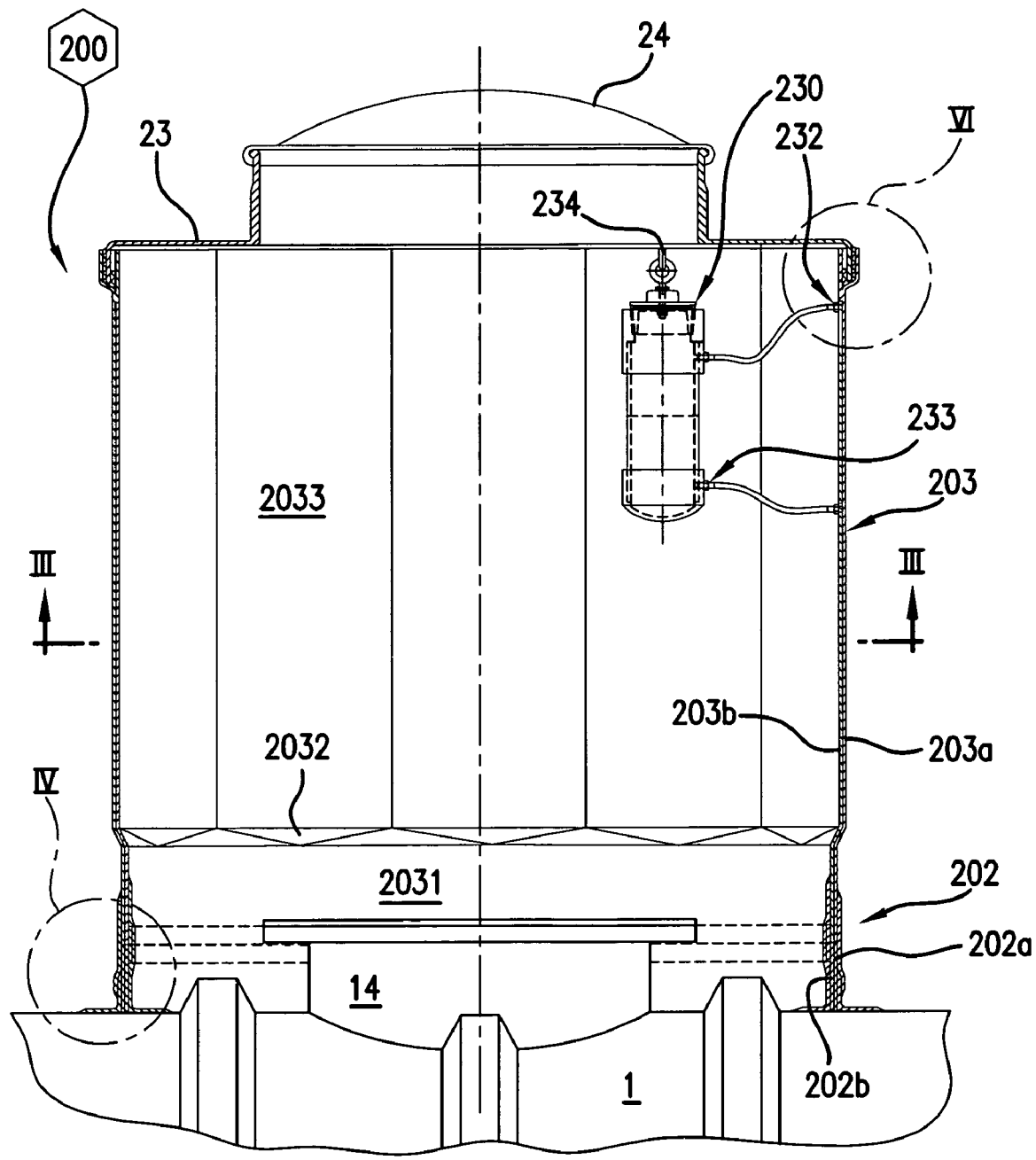
FIG. 2 is a partial cross-sectional diagram illustrating a double walled riser sump according to one embodiment of the present invention.
Figure 3B:
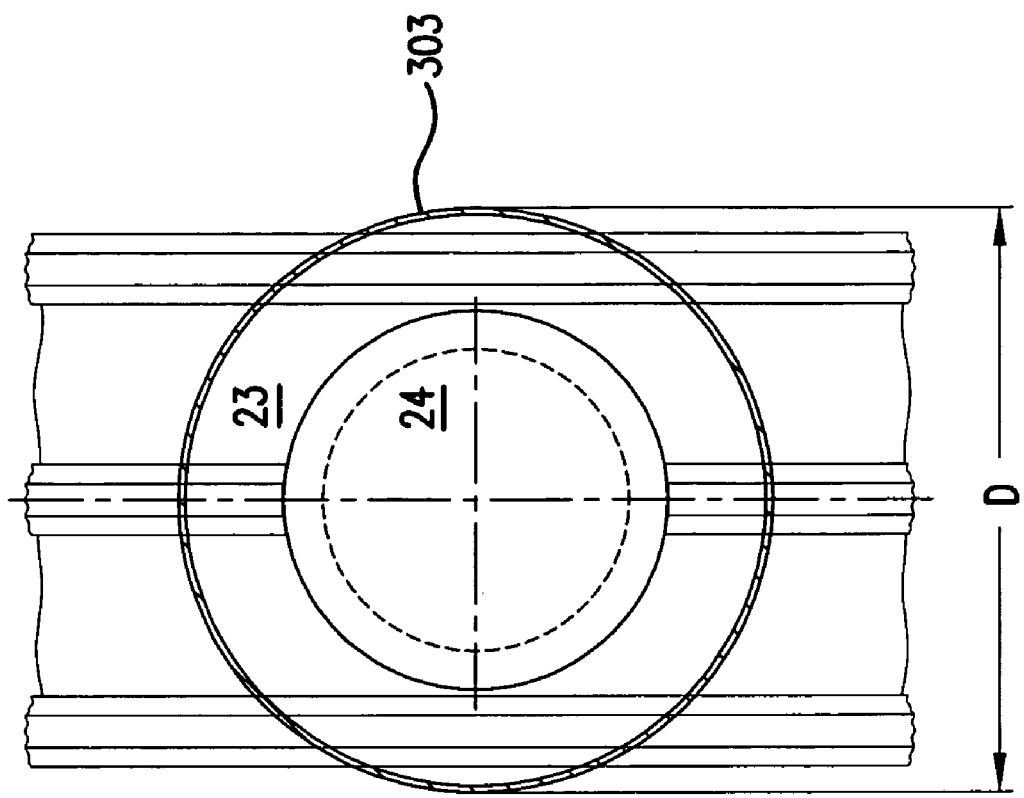
FIGS. 3a and 3b are cross sectional views taken along the line III-III in FIG. 2 illustrating alternative shapes of the double walled riser sump according to the present invention.
Figure 3A:
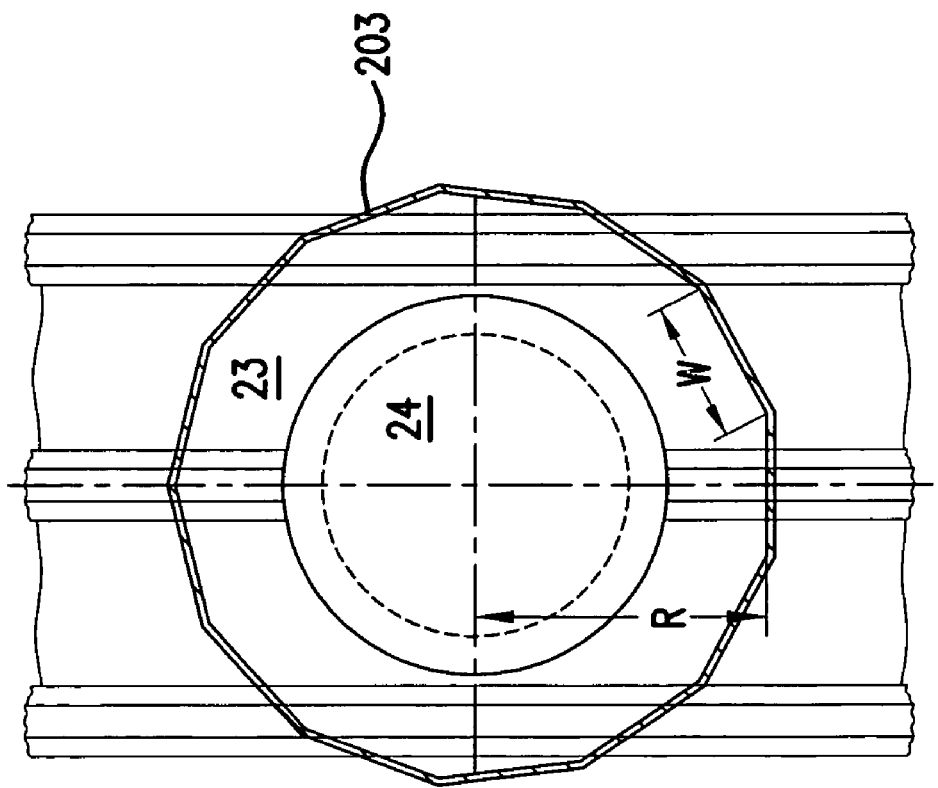

The present invention addresses this need to a great extent by providing a double walled containment sump 200 including a double walled collar 202 and a double walled riser 203 as shown in FIG. 2 (the double walled pipe 20, flex connector 27, sensor 8, extractor assembly 21 and level probe 7 of FIG. 1 are not illustrated in FIG. 2 in order to avoid obscuring the present invention). The double walled collar 202 includes an outer wall 202a and an inner wall 202b, and the double walled riser includes an outer wall 203a and an inner wall 203b. In the embodiment shown in FIG. 2, the collar 202 has a-circular cross sectional shape. The lower portion 2031 of the riser 203 has a corresponding circular shape. The lower portion 2031 is connected to a transition region 2032 which in turn is connected to an upper portion 2033 with a cross sectional shape of a polygon as illustrated in FIG. 3(a).

Referring now back to FIG. 2, it is possible for the annular space between the inner walls 202b, 203b and the outer walls 202a, 203a to be largely devoid of any material (other than, in the case of a wet annulus monitoring system, monitoring fluid) except for structural elements such as standoffs or support rods necessary to keep the outer and inner walls 202a,b separate. However, in preferred embodiments, the outer and inner walls of both the riser 203 and collar 202 are separated by an annular material (shown in FIG. 4 as 203c, 202c, respectively) of a type that allows fluid to flow along its surface or of a type through which fluids may flow. In some preferred embodiments, the annular material 202c, 203c is a thin plastic film. Polyester films are preferred. An exemplary film of this type, which is preferably "crinkled," so as to promote the flow of fluids, is sold under the trademark Mylar®, which can be obtained from Qualis, Inc. of Henderson, Ky. When films such as this are employed as the annular material 202c, 203c, the thickness of the material is generally much less than 1 mil., and may be as thin as the material permits while retaining the ability to be applied during manufacture of the sump.

In alternative embodiments, the annular material 202c, 203c is a three dimensional distance fabric that allows fluids, and preferably liquids, to pass therethrough. Suitable three dimensional materials include those sold under the marks PARABEAM, FLO-CORE, TECHNO-TEX and SYN-COLOOP, as well as the annular materials described in U.S. Pat. No. 5,220,823. The three dimensional material is preferably load-transmitting material that allows the passage of liquids. In the such alternative embodiments, these materials may be adhered to both the inner and outer walls to provide enhanced shear strength to such a tank.

Figure 4:
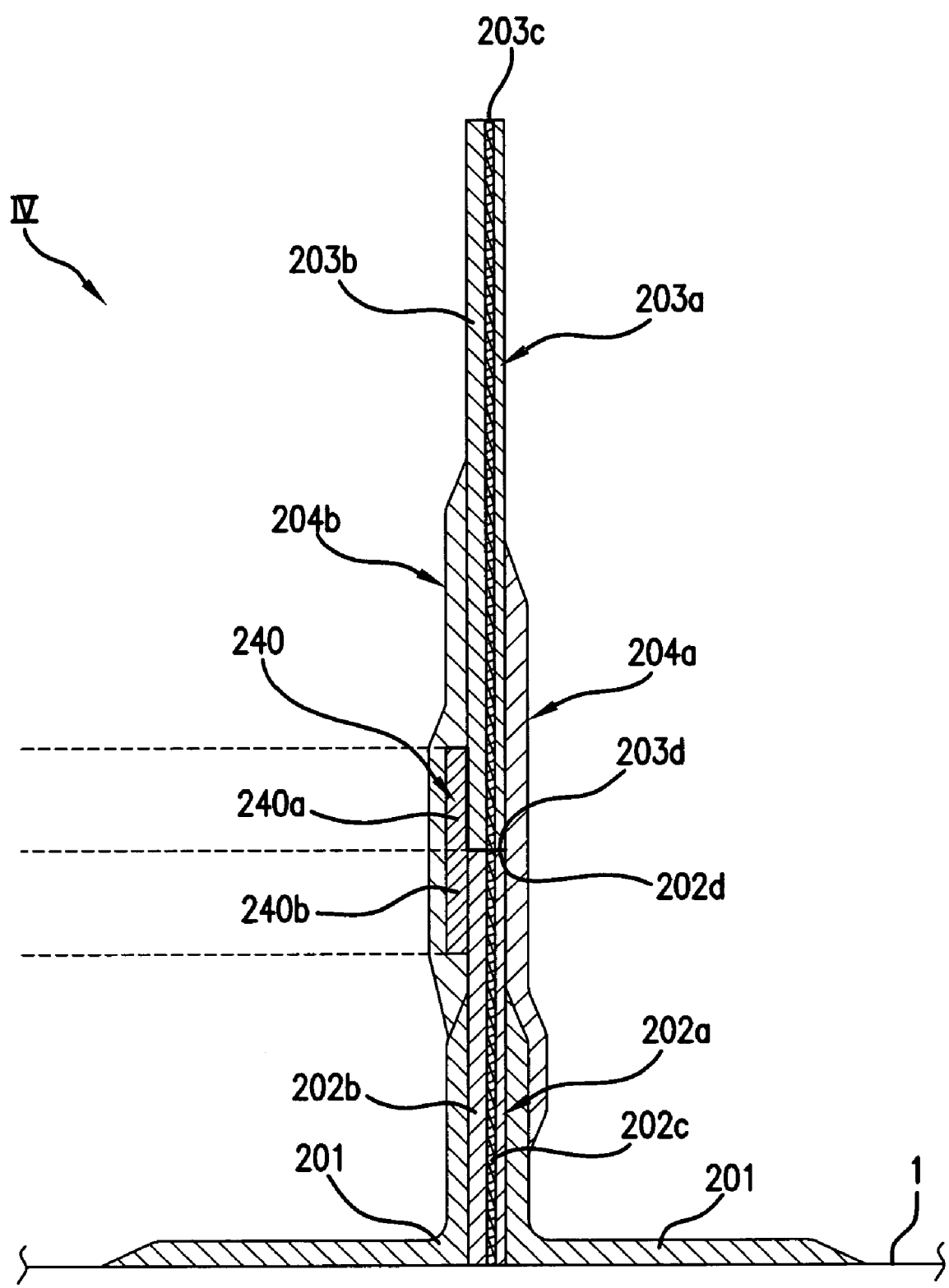
FIG. 4 is a cross sectional view of a portion IV of the double walled riser sump of FIG. 2.

FIG. 4 illustrates a cross sectional view of the connection of the double walled collar 202 and the double walled riser 203 of FIG. 2. The collar 202 is preferably secured to the UST 1 with a layer 201 of FRP on both the inside and outside of the collar 202. The bottom end of the annular space between the collar walls 202a,b is bounded by the outer wall of the UST 1 (thus, the annular space between the collar walls 202a,b is separate from and not in fluid communication with any annular space between the walls of the double walled UST 1). The joint between the collar 202 and UST 1 is watertight and typically (but not necessarily) made at the factory. After the UST 1 has been positioned at the installation site, but typically before the installation site has been backfilled, the riser 203 is attached to the collar 202, again with a watertight joint. Preferably, this is done with the aid of an alignment ring 240, which is also preferably formed from FRP. The alignment ring 240 fits on the inside of, and closely adjacent to, the interior collar wall 202b, with a portion 240a of the alignment ring 240 extending past the top 202d of the collar 202 and a portion 240b of the alignment ring 240 extending below the top 202d of the collar 202.

After the alignment ring 240 is in place, the riser 203 is fit over the collar 202 with the bottom surface 203d of the riser 202 adjacent to the top surface 202d of the collar 202. It is important for the annular space between the walls 203a,b of the riser 203 to be in fluid communication with the annular space between the walls 202a,b of the collar 202. The alignment ring 240 promotes such fluid communication by aligning the two annular spaces. To further ensure fluid communication between the two annular spaces, no resin or other adhesive is used between the collar top surface 202d and the riser bottom surface 203d in preferred embodiments.

To further promote alignment of and fluid communication between the two annular spaces of the riser 203 and collar 202, the collar 202 and riser 203 are made from adjacent sections of the same "pipe" in preferred embodiments. That is, a first portion is cut from a tubular portion of FRP to form the collar 202 and a second portion of the same tubular portion of FRP is cut to form the riser 203. The riser 203 and collar 202 are more preferably formed from adjacent portions of the same tubular portion of FRP, and more preferably still are formed such that the riser bottom portion 203d and collar top portion 202d were originally connected. However, it should be understood that precise alignment of the annular spaces (and the aforementioned formation of the collar and riser from the same FRP pipe) of the collar 202 and riser 203 is not necessary. Because no resin or other adhesive is used in between the collar top surface 202d and the riser bottom surface 203d, the irregularities between these surfaces provides a gap sufficient for fluid communication between the collar and riser annular spaces even in the absence of a precise alignment of the collar 202 and riser 203.

Once the riser 203 is in place over the collar 202, bands 204a,b (sometimes referred to in the art as a "lay up") of FRP are deposited around the joint between the collar 202 and riser 203 both on the outer walls 202a, 203a, and on the inner walls 202b, 203b over the alignment ring 240 to form a watertight joint. The bands 204a,b may partially overlap the lay up 201 securing the collar 202 to the tank 1. As discussed above, preferably none of the FRP in the band 204 is deposited between the collar upper surface 202d and the riser lower surface 203d.

Figure 9:
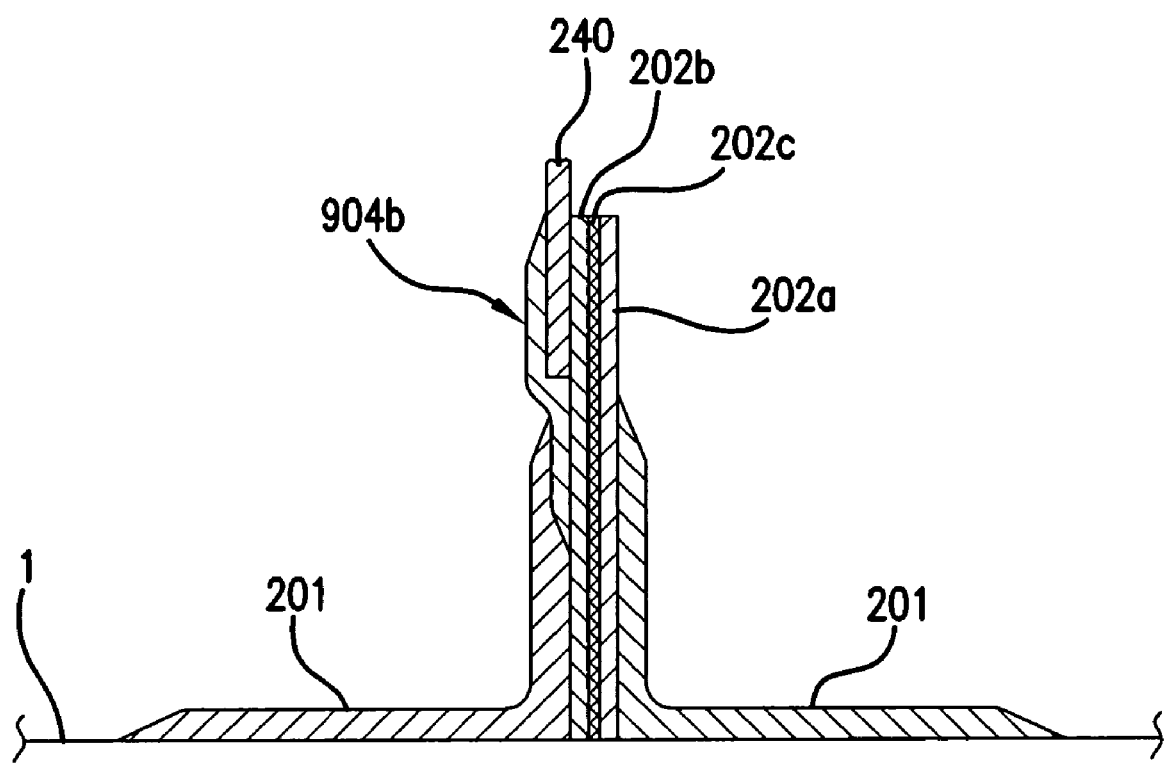
FIG. 9 is a cross-sectional view, similar to FIG. 4, of a portion of a double walled riser sump according to yet another embodiment of the invention.

In the embodiment of FIG. 4, the alignment ring 240 is installed after the collar 202 has been attached to the tank 1 and the entire interior joint between the collar 202, riser 203 and alignment ring 240 is made with one lay-up 204b. However, in other embodiments, the alignment ring 240 is attached to the collar 202 prior to installation of the collar 202 on the tank with the top of the alignment ring 240 extending past the top 202d of the collar 202. This may be done prior to installation of the collar 202 on the tank 1 as shown in FIG. 9, which illustrates a lay-up 904b between the alignment ring 240 and collar inside wall 202b "underneath" the layup 201 attaching the collar 202 to the tank 1. Alternatively, the collar 202 may be bonded to the tank 1 first and the alignment ring 240 bonded to the collar 202 at a later time, again preferably to installation of the tank at the site. The riser 203 is then preferably installed over the collar 202 and alignment ring 240 at the installation site.

Referring now back to FIG. 2, the annular space between the collar and riser outer and inner walls 202a,b and 203a,b is filled with brine supplied from a reservoir 230 connected to the annular space by a vent tube 232 and a supply tube 233. The reservoir 230 is separate from any reservoir associated with the interstitial, or annular, space of the double walled UST 1. The reservoir 230 is preferably translucent and preferably includes brine level indicator markings (not shown in FIG. 2) to facilitate monitoring of the brine level. An electronic sensor may also be used in some embodiments. The reservoir 230 is preferably held to the top 23 of the riser 203 by a hook 234 such that it is easily accessible. Alternatively, the reservoir 230 may be located under the riser dome 24. If a leak in either wall of the sump develops, the brine will flow through the annular space between the walls of the riser 203 and collar 202, and a corresponding drop in the level of brine will be noticeable at the reservoir 230.

Figure 5A:
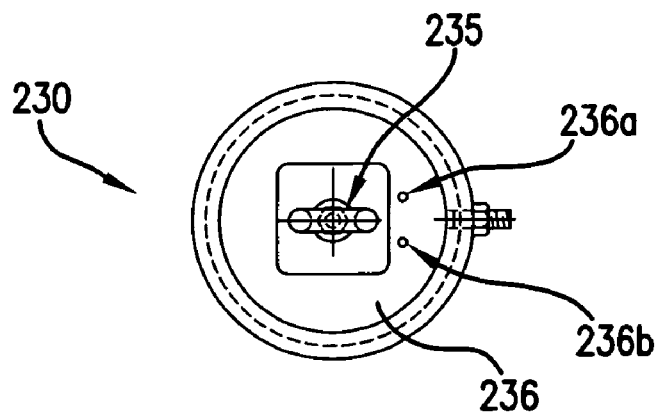
FIGS. 5a and 5b are top and side views, respectively, of a reservoir of the double walled riser sump of FIG. 2.
Figure 5B:
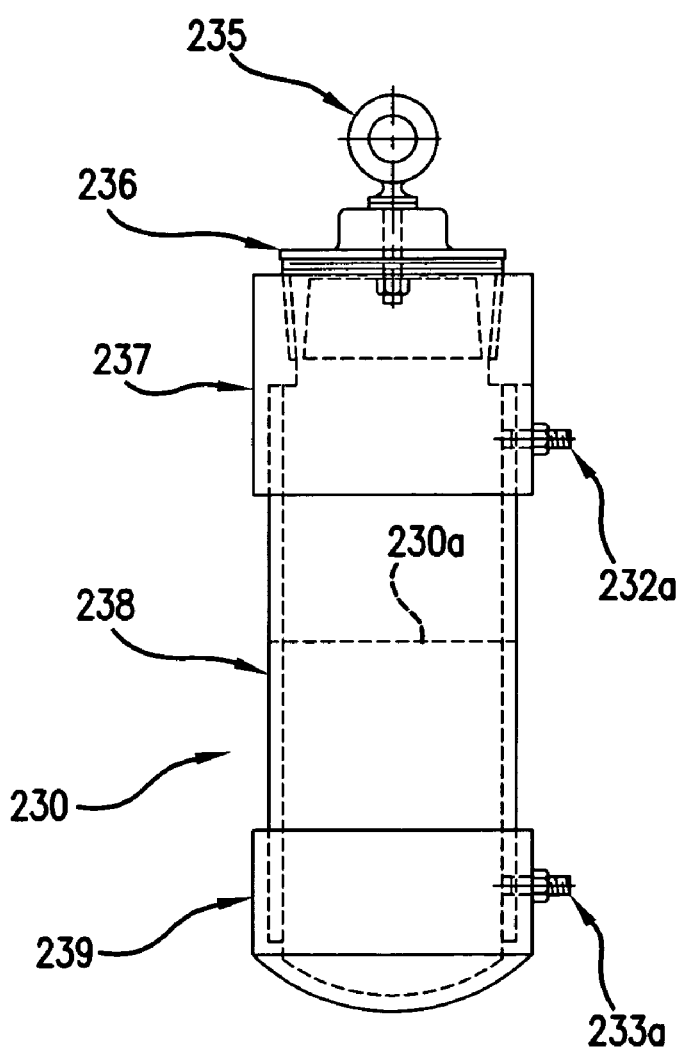
Figure 6:
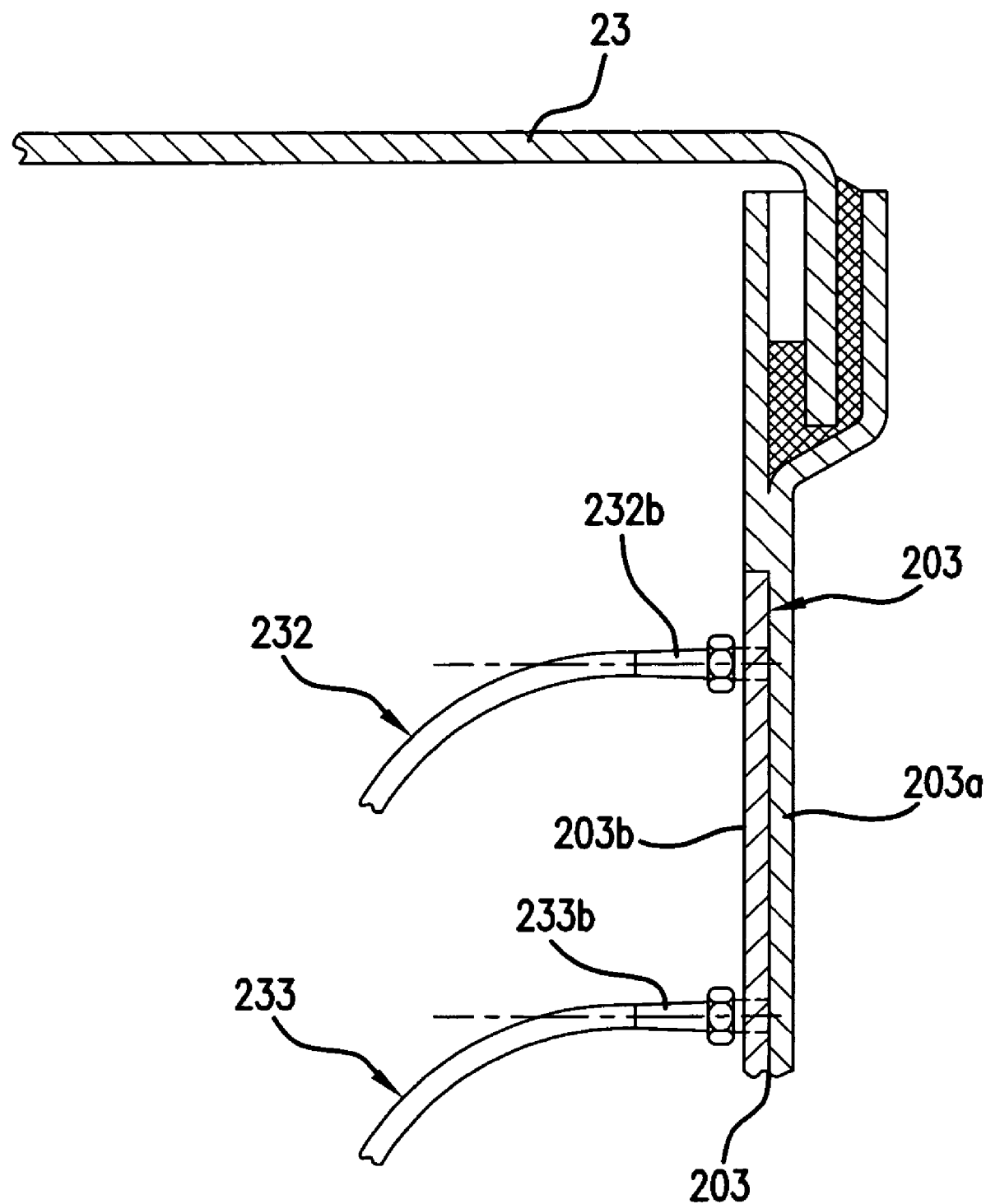
FIG. 6 is a cross sectional view of a top portion of the double walled riser sump of FIG. 2 illustrating connection of the reservoir of FIGS. 5a and 5b.

FIGS. 5a and 5b are top and side views, respectively, of the reservoir 230. The reservoir 230 includes an eyebolt 235 (which is used to hang the reservoir from the hook 234 as shown in FIG. 2) attached to a threaded plug 236. The plug 236 has two holes 236a, 236b formed therein in addition to hole through which the eyebolt 235 is attached. The first hole 235a is provided to allow a wire for a brine level sensor to pass through the plug 236. The second hole 236a is a vent hole whose purpose will be discussed further below. The plug 236 is threaded into a threaded end of a female pipe adapter 237. A top portion of a length of clear (preferably PVC) pipe 238 is joined to the other end of the adapter 237. The bottom portion of the pipe 238 is joined to a PVC cap 239 to form the reservoir 230. Nipples 232a, 233a are inserted through the adapter 237 and cap 239, respectively. The nipple 232a is connected to the brine vent tube 232 of FIG. 2, and the nipple 233a is connected to the brine supply tube 233. As shown in FIG. 6, the brine vent tube 232 is in fluid communication, via nipple 232b, with a portion of the interstitial space 203 near the top of the riser just below where the interstitial space 203 ends at the junction of the riser inner and outer walls 203a,b. The brine supply tube 233 is also in fluid communication with the interstitial space 203 via nipple 233b at a position lower than the nipple 232b for the vent tube.

In practice, the reservoir is usually filled halfway as indicated by the dashed line 230a of FIG. 5b. In the event of a leak in one of the walls of the double walled riser sump, brine in the reservoir 230 will flow through the supply tube 233a to the interstitial space between the riser and collar inner and outer walls and out through the leak. The vent tube 233 connected to nipple 233a provides fluid communication to ambient air through the vent hole 236a in the plug 236 on the top of the reservoir 230, thereby allowing air into the interstitial space 203 between the riser and collar walls 202, 203 of the double walled riser sump to facilitate flow of brine out of the reservoir.

Figure 7:
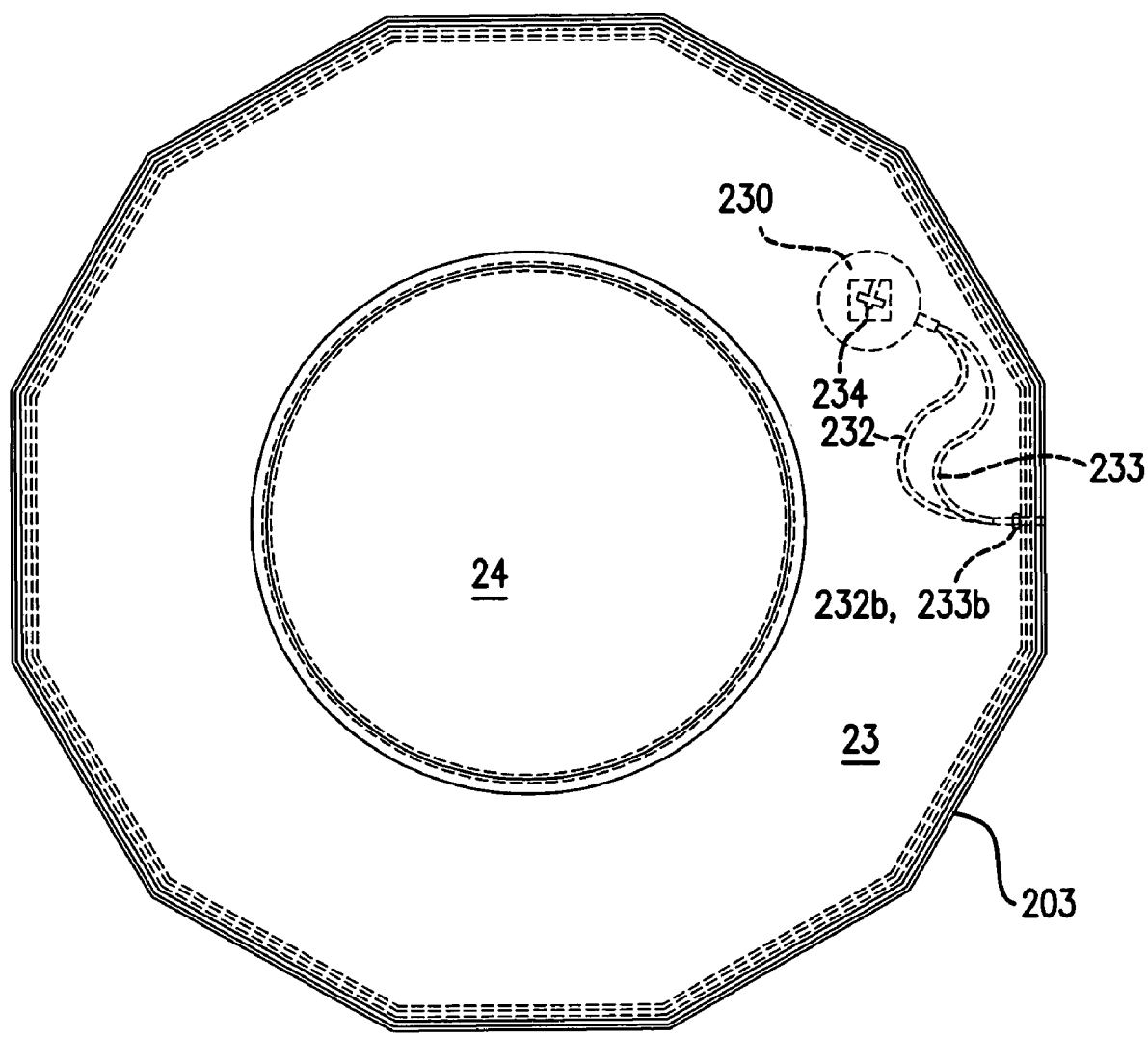
FIG. 7 is a top view of the double walled riser sump of FIG. 2 illustrating positioning of the reservoir of FIG. 5.

The reservoir 230 is preferably positioned under the riser top 23 at a position spaced apart from the nipples 232b, 233b connected to the interstitial space 203 as illustrated in FIG. 7. This ensures that the tubes 232, 233 will remain out of the way and will not hang down to the bottom of the sump when the reservoir 230 is hung on the hook 234.

Alternative embodiments of the invention employ a dry annular monitoring system. In such system, one or more sensors are located at the bottom of the annular space formed by the walls of the collar 202 and riser 203. Any ground-water leaking through the outer walls 202a, 203a, or any fluid leaking from the interior of the sump through the inner walls 202b, 203b, will be detected by the sensor(s) at the bottom of the annular space and will be contained by the intact wall. In yet other alternative embodiments, the annular space between the walls of the riser 203 and collar 202 are pressurized (either negatively or positively) and the pressure is monitored in a manner well known in the art.

As discussed above and illustrated in FIG. 3a, the riser 203 has a cross sectional shape in the form of a polygon with a plurality of flat sides of width W to simplify the connection of pipe, including double walled pipe. A regular polygon is illustrated in FIG. 3A, but it is not necessary for the polygon to be regular. It is preferable for the polygon to have as many sides as possible to provide surfaces for pipe connection at as large a number angles as possible. However, for a riser of a given diameter, as the number of sides increases, the width W of each side decreases, and each side must be wide enough to allow for pipe connections.

For example, when using 4 inch diameter pipe, it is preferable for each side to have a minimum width of about 10 inches. The ten inch width comprises four inches for the diameter of the pipe, two inches on each side of the pipe (a total of four inches) to allow for a coupling including rubber grommet that is typically used to seal the connection between the pipe and the sump wall, and two additional inches as a safety factor to allow for misalignment between the center of the pipe and the center of the wall. For a riser with a nominal 42 inch (a common size of round cross sectional shape risers) diameter (the riser has a radius R of 21 inches as measured from the center to a midpoint of a side), the ten inch minimum wall width corresponds to a 13 sided polygon as shown in FIG. 3a with each side having a width of approximately 10⅜ inches. In other embodiments, nominal 42 inch diameter risers have 12 or 11 sides.

In alternative embodiments, the upper portion of the riser has a circular cross sectional shape. A cross sectional view of the upper portion of such a riser 303 is shown in FIG. 3b.

In the embodiments discussed above, the vertical wall of the sump is formed from a combination of a collar and riser. It is customary in the industry to provide USTs with a collar having a standard height and to provide a customer with a choice of riser heights. The customer can then select a riser height appropriate for a desired installation site. Among other things, this makes it easier to ship the UST. It should be noted that it is also possible to practice the invention with a sump having two continuous vertical walls rather than the vertical walls formed from a combination of a riser and collar.

Figure 8A:
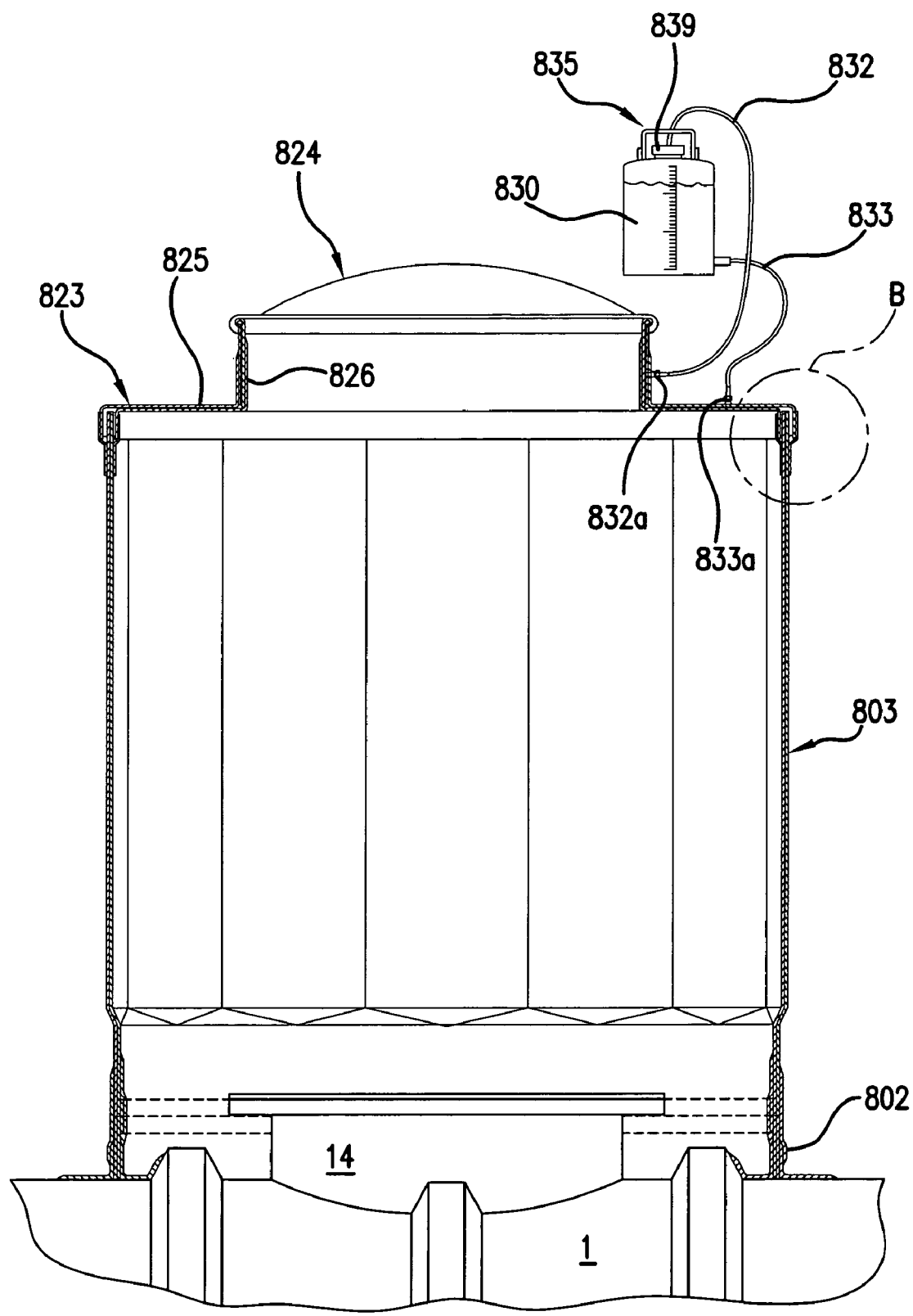
FIGS. 8a, 8b, and 8c illustrate a double walled riser sump having a double walled top according to another embodiment of the invention.
Figure 8B:
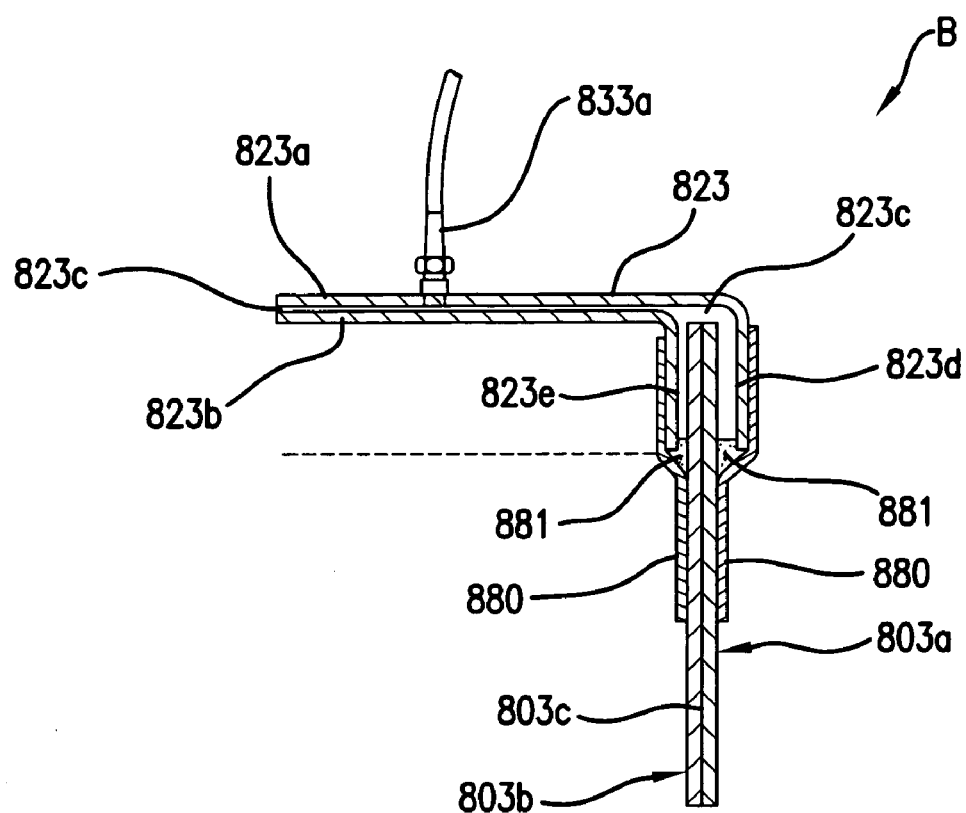

In the embodiments of the invention, the double walled riser sump is provided with a double walled top 823 as shown in FIGS. 8a,b,c. Referring now to FIG. 8b, the double walled top includes an outer wall 823a and an inner wall 823b that are spaced apart to form a top interstitial space 823c. The top interstitial space 823c is in fluid communication with the riser interstitial space 803c, which extends the entire length of riser walls 803a,b in this embodiment. The top inner and outer walls 823a,b include vertical portions 823d,e, respectively, that are spaced apart to allow insertion of the top 823 over the riser walls 803a,b. The joint between the vertical portions 823d,e and the riser walls 803a,b is sealed with FRP lay-ups 880 over both the inner and outer walls. Putty 881 may optionally be placed at near the ends of the riser wall vertical portions 823d,e to provide support for the lay-ups 880 until they cure.

Figure 8C:
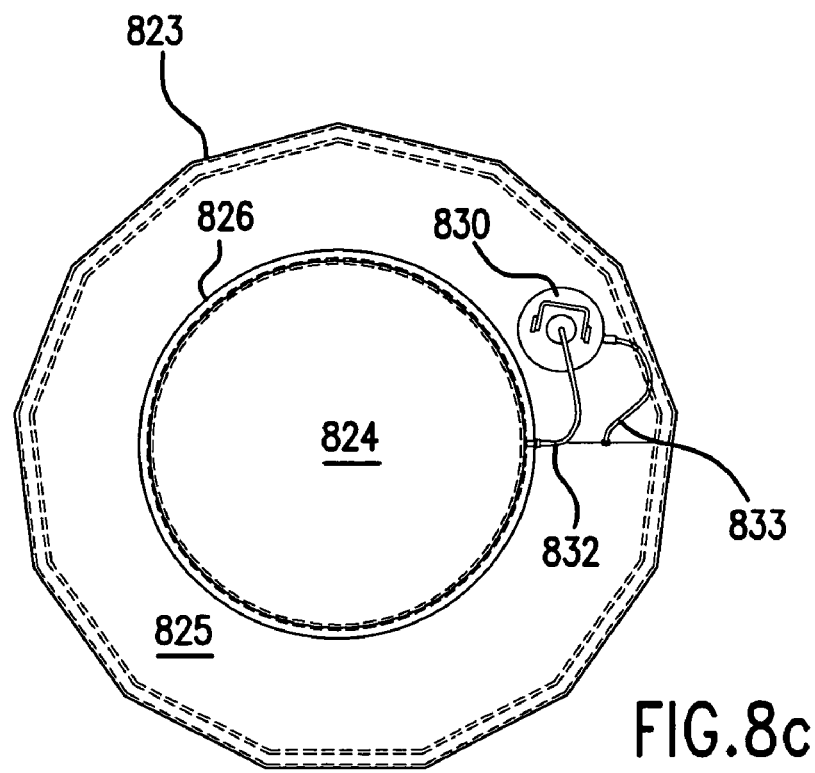

The interstitial spaces 823c, 803c are supplied with brine from reservoir 830 via supply tube 833 and supply nipple 833a, which extends through the top outer wall 823a into top interstitial space 823c. The reservoir 830 is positioned above the top 823 and normally rests on the flat portion 825 of the top 823 as shown in FIG. 8c. A vent tube 832, which is connected between the reservoir top 839 (preferably above the water level) and the interstitial space 823c via a nipple 832a extending through a vertical portion 825 of the top 823, supplies air to the interstitial spaces 823c, 803c in the event of a leak in either the top 823, the riser 803, or the collar 802 while also preventing brine from escaping if the reservoir 830 is lifted above the top 823 as shown in FIG. 8a.

While the present invention bears some similarity to a double walled underground storage tank, there are some notable differences. One difference is that the second wall of an underground storage tank is necessary to perform the secondary containment function, while the second wall of the double-walled sump is not necessary to perform the secondary containment function. This can be seen with reference again to FIG. 1. The primary containment of fluid traveling through double walled pipe 20 to UST 1 comprises the inner wall 26 of double walled pipe 20, the flex connector 27, and the inner wall of UST 1. The secondary containment of this fluid is provided by the outer wall 28 of double wall pipe 20, one of the walls (either outer or inner) of collar 2 and riser 3, and the outer wall of UST 1. Thus, the second walls of the collar 2 and riser 3 are not necessary to provide secondary containment.

Rather, the second walls of the collar 2 and riser 3 provide a means to monitor the integrity of the first walls of the collar 2 and riser 3 that perform the secondary containment function. Accordingly, in some embodiments, one of the walls of the double walled sump is not structural. For example, the outer walls of the riser and collar may be of sufficient strength to withstand the inward forces exerted by the ground and ground water and any outward forces exerted by leaking fluid, whereas the inner walls of the riser and collar may be only as strong as required to withstand the forces exerted on the inner walls by the particular monitoring system (e.g., brine) being utilized to monitor the integrity of the annular space between the sump walls. Alternatively, both walls of the double walled sump may have sufficient structural strength to perform the containment function, or the annular space between the sump walls may include a load transmitting material that allows the inner and outer walls to act together to resist load, in which case the sump provides triple containment. This may be desirable when the sump is to be used with a triple walled underground storage tank such as that described in U.S. Pat. No. 6,398,057, issued Jun. 4, 2002, also owned by Xerxes Corp.

Obviously, numerous modifications and variations of the present invention are possible in light of the above teachings. It is therefore to be understood that within the scope of the appended claims, the invention may be practiced otherwise than as specifically described herein.

What is claimed is:

1. An underground storage system comprising:
an underground storage tank;
a double walled riser sump having a vertical wall terminating in a top, the vertical wall including an inner wall and a spaced apart outer wall, the outer wall and the inner wall defining an annular space; and
a monitoring liquid reservoir containing a liquid and being in fluid communication with the annular via a liquid supply tube and a liquid vent tube; wherein the monitoring liquid reservoir is a separate container from the vertical wall of the riser sump;

wherein the vertical wall is formed from a riser and a collar, the collar being attached to the underground storage tank and the riser being attached to the collar, the riser being formed from an inner riser wall and an outer riser wall that together define a riser annular space, the collar being formed from an inner collar wall and an outer collar wall that together define a collar annular space, the riser annular space and the collar annular space being in fluid communication with each other; and wherein the reservoir is positioned near the top of said vertical wall, whereby the reservoir is accessible from a space adjacent said top, and wherein the reservoir includes two holes, the first of said holes being a vent hole for communicating ambient air to the reservoir and the second of said holes providing for the insertion of sensing means into the reservoir.

2. The underground storage system of claim 1, further comprising a thin film disposed within the annular space, such that liquid can flow throughout the annular space.

3. The underground storage system of claim 1, further comprising a distance fabric disposed within the annular space, the distance fabric allowing liquids to flow within the annular space.

4. The underground storage system of claim 1, further comprising an alignment sleeve, the alignment sleeve having a first portion in a closely spaced adjacent relationship to the riser and a second portion in a closely spaced adjacent relationship to the collar.

5. The underground storage system of claim 4, wherein the alignment sleeve is adjacent to the inner collar wall and the inner riser wall.

6. The underground storage system of claim 4, wherein the alignment sleeve is adjacent to the outer collar wall and the outer riser wall.

7. The underground storage system of claim 1, wherein the monitoring liquid reservoir is filled with brine.

8. The underground storage system of claim 1, further comprising a liquid sensor disposed within the annular space.

9. The underground storage system of claim 1, wherein the underground storage tank is a double walled underground storage tank.

10. The underground storage system of claim 1, wherein the sump is formed from fiber reinforced plastic.

11. The underground storage system of claim 10, wherein the underground storage tank is formed from fiber reinforced plastic.

12. The underground storage system of claim 1, wherein the sump has a round cross sectional shape.

13. The underground storage system of claim 1, wherein the sump has a cross sectional shape in the form of a polygon having a plurality of sides.

14. The underground storage system of claim 13, wherein the polygon is a regular polygon and each side of the polygon has a width sufficient for the passage of a pipe.

15. The underground storage system of claim 13, wherein the polygon has a number of sides, the number being less than fourteen and more than ten.

16. The underground storage system of claim 1, wherein the top double walled riser sump is formed from an inner wall and an outer wall defining a top annular space, the top annular space being in fluid communication with the annular space in the vertical wall.

17. A method for forming a sump comprising the steps of:
attaching a vertical wall to an underground storage tank, the vertical wall including an inner wall and a spaced apart outer wall, the outer wall and the inner wall defining an annular space; and attaching a top to the vertical wall;

wherein the step of attaching the vertical wall to the underground storage tank comprises the steps of:

attaching a collar to the underground storage tank to form a watertight connection, the collar being formed from an inner collar wall and an outer collar wall that together define a collar annular space;

attaching a riser to the collar to form a watertight connection, the riser being formed from an inner riser wall and an outer riser wall that together define a riser annular space in fluid communication with the collar annular space; and providing a monitoring liquid reservoir containing a liquid and being in fluid communication with the annular space via a liquid supply tube and a liquid vent tube; wherein the monitoring liquid reservoir is a separate container from the vertical wall of the riser sump; wherein the reservoir is positioned near the top of said vertical wall;

further comprising the step of providing the reservoir with two holes, the first of said holes being a vent communicating ambient air to the top of said reservoir and the second of said holes being a portal whereby sensing means are inserted into the reservoir.

18. The method of claim 17, further comprising the step of disposing a thin film within the annular space, such that liquid can flow throughout the annular space.

19. The method of claim 17, further comprising the step of disposing a distance fabric within the annular space, the distance fabric allowing liquids to flow throughout the annular space.

20. The method of claim 17, further comprising the step of providing an alignment sleeve, the alignment sleeve having a first portion in a closely spaced adjacent relationship to the riser and a second portion in a closely spaced adjacent relationship to the collar.

21. The method of claim 20, wherein the collar is attached to the underground storage tank prior to installation of the storage tank at a desired site and the riser is attached to the collar after the underground storage tank is at the desired site.

22. The method of claim 20, wherein the alignment sleeve is adjacent to the inner collar wall and the inner riser wall.

23. The method of claim 17, further comprising the step of disposing a liquid sensor within the annular space.

24. The method of claim 17, wherein the vertical wall has a round cross sectional shape.

25. The method of claim 17, wherein the vertical wall has a cross sectional shape in the form of a polygon having a plurality of sides.

26. The method of claim 25, wherein the polygon is a regular polygon and each side of the polygon has a width sufficient for the passage of a pipe.

27. The method of claim 25, wherein the polygon has a number of sides, the number being less than fourteen and more than ten.

28. The method of claim 17, wherein the top is a double walled top defining a top annular space, and the top is attached to the vertical wall such that the top annular space is in fluid communication with the annular space in the vertical wall.

* * * * *